US009951981B2

(12) United States Patent
Ragazzi

(10) Patent No.: US 9,951,981 B2
(45) Date of Patent: Apr. 24, 2018

(54) SYSTEM AND METHOD FOR MANAGING LUBRICANT WITHIN A VAPOR COMPRESSION HEAT PUMP

(71) Applicant: Ford Global Technologies, LLC, Dearborn, MI (US)

(72) Inventor: Franco Ragazzi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 792 days.

(21) Appl. No.: 14/334,365

(22) Filed: Jul. 17, 2014

(65) Prior Publication Data

US 2016/0018145 A1 Jan. 21, 2016

(51) Int. Cl.
| | |
|---|---|
| *F25B 47/00* | (2006.01) |
| *F25B 5/04* | (2006.01) |
| *F25B 6/04* | (2006.01) |
| *F25B 25/00* | (2006.01) |
| *B60H 1/00* | (2006.01) |
| *B60H 1/32* | (2006.01) |

(52) U.S. Cl.
CPC ......... *F25B 47/00* (2013.01); *B60H 1/00385* (2013.01); *B60H 1/00921* (2013.01); *B60H 1/3214* (2013.01); *F25B 5/04* (2013.01); *F25B 6/04* (2013.01); *F25B 25/005* (2013.01); *B60H 2001/00928* (2013.01); *F25B 2341/0662* (2013.01)

(58) Field of Classification Search
CPC .............................. B60H 1/3214; B60H 1/323
USPC ..................................................... 62/192, 193
See application file for complete search history.

(56) References Cited

U.S. PATENT DOCUMENTS

| | | | | |
|---|---|---|---|---|
| 5,408,841 | A * | 4/1995 | Fujiwara | B60H 1/3225 62/192 |
| 6,505,475 | B1 | 1/2003 | Zugibe et al. | |
| 7,533,536 | B1 | 5/2009 | Zugibe et al. | |
| 2005/0252225 | A1 | 11/2005 | Vetter | |
| 2010/0089082 | A1* | 4/2010 | Kawano | F25B 31/004 62/192 |
| 2016/0031291 | A1* | 2/2016 | Enomoto | B60H 1/00385 62/179 |
| 2016/0153343 | A1* | 6/2016 | Kakehashi | B60H 1/00885 123/41.31 |

OTHER PUBLICATIONS

Smith, Mark G. et al., "Climate Control System," U.S. Appl. No. 14/010,057, filed Aug. 26, 2013, 14 pages.

* cited by examiner

*Primary Examiner* — Cassey D Bauer
(74) *Attorney, Agent, or Firm* — David Kelley; McCoy Russell LLP

(57) ABSTRACT

Methods and system for managing lubricant within a vapor compression heat pump are presented. In one example, lubricant may be flushed from selected areas of a heat pump to other areas of the heat pump where lubricant is desired. The lubricant may be flushed in full flushing mode or in a partial flushing mode.

14 Claims, 5 Drawing Sheets

SYSTEM AND METHOD FOR MANAGING LUBRICANT WITHIN A VAPOR COMPRESSION HEAT PUMP

FIELD

The present description relates to methods and a system for managing lubricant within a vapor compression heat pump of a vehicle. The methods and system may be particularly useful for vehicles that are propelled by an electrical device.

BACKGROUND AND SUMMARY

A vehicle may include a heat pump for heating and cooling a passenger compartment. The heat pump may include a compressor for pressurizing refrigerant. The refrigerant may travel throughout the heat pump system and transfer heat between two or more different locations. The lubricant used in the compressor may be mixed with the refrigerant and the lubricant may travel throughout the heat pump system. Over time, lubricant may attach itself to the inner walls of the heat pump components, such as heat exchangers and refrigerant lines. This may reduce the amount of lubricant available to the compressor, resulting in compressor degradation. Further, lubricant may reduce the heat transfer characteristics of the heat exchangers. Lubricant may accumulate in components other than the compressor while the compressor is running during normal operation of the system. Further, lubricant may accumulate throughout the heat pump system while the compressor is off as refrigerant migrates due to temperature gradients between the various components of the refrigerant subsystem. An oil separator may be used to delay lubricant accumulation in refrigerant subsystem components away from the compressor, but the undesirable conditions associated with lubricant accumulation persist.

The inventors herein have recognized the above-mentioned disadvantages and have developed a method for a vehicle heat pump, comprising: selecting a heat pump flushing mode in response to a vehicle being electrically coupled to a stationary power grid; and flushing the vehicle heat pump via activating a pump.

By activating a pump of a heat pump system, it may be possible to provide the technical result of flushing lubricant from locations in a heat pump system where lubricant is undesirable to locations where lubricant is desired. Consequently, heat pump efficiency may be improved. In one example, the pump may be activated when the heat pump has not operated for a predetermined amount of time while a vehicle in which the heat pump is located is electrically coupled to a stationary power grid. The stationary power grid may allow the heat pump to flush lubricant from refrigerant subsystem components where it is not desired without draining a vehicle battery.

The present description may provide several advantages. In particular, the approach may improve heat pump efficiency. Additionally, the approach may improve heat pump durability. Further, the approach may provide different approaches to flushing a heat pump of lubricant.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
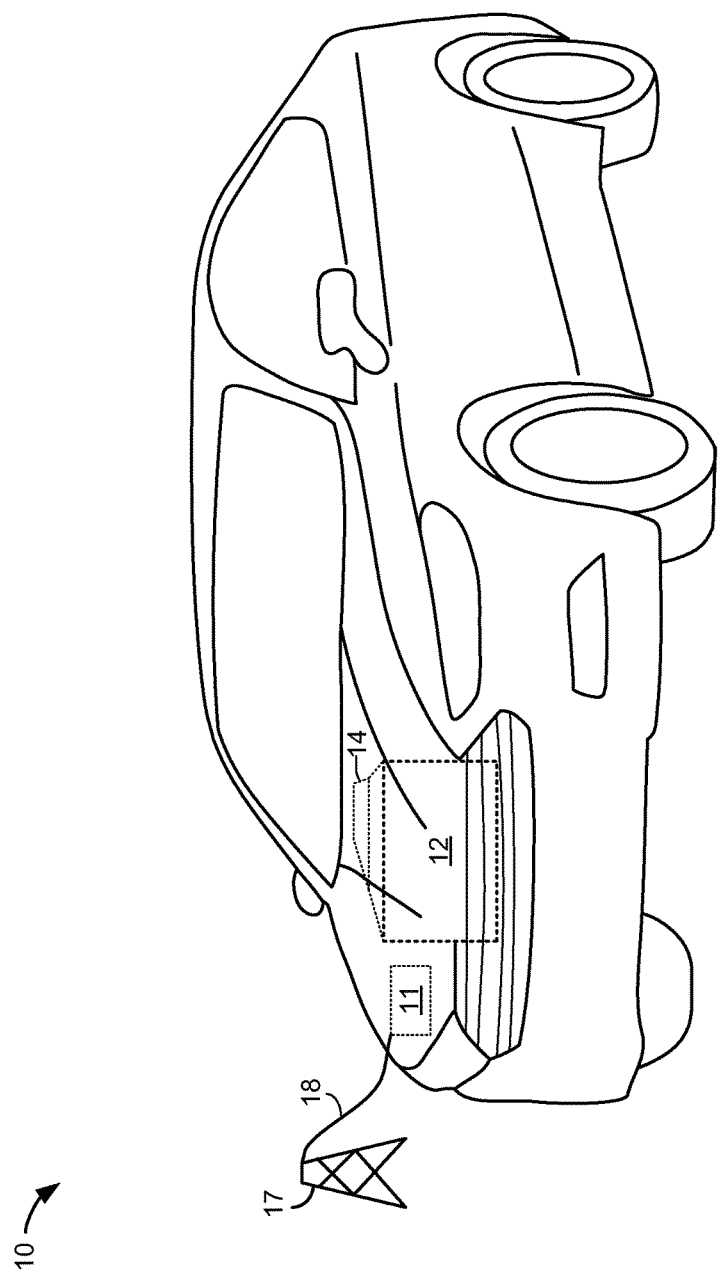
FIG. 1 is a schematic diagram of a vehicle.
Figure 2:
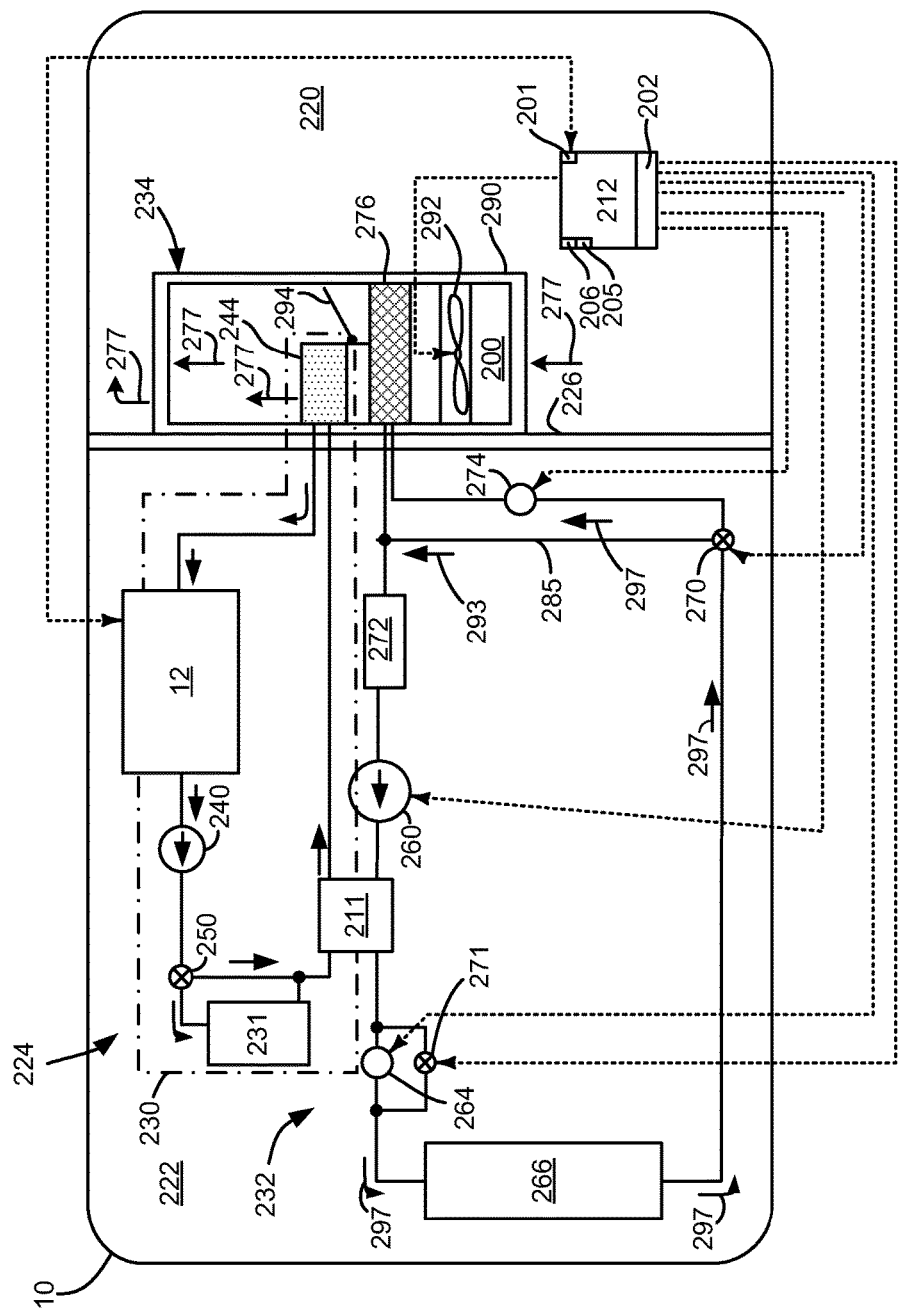
FIG. 2 shows an example vehicle climate control system for the vehicle of FIG. 1.
Figure 3:
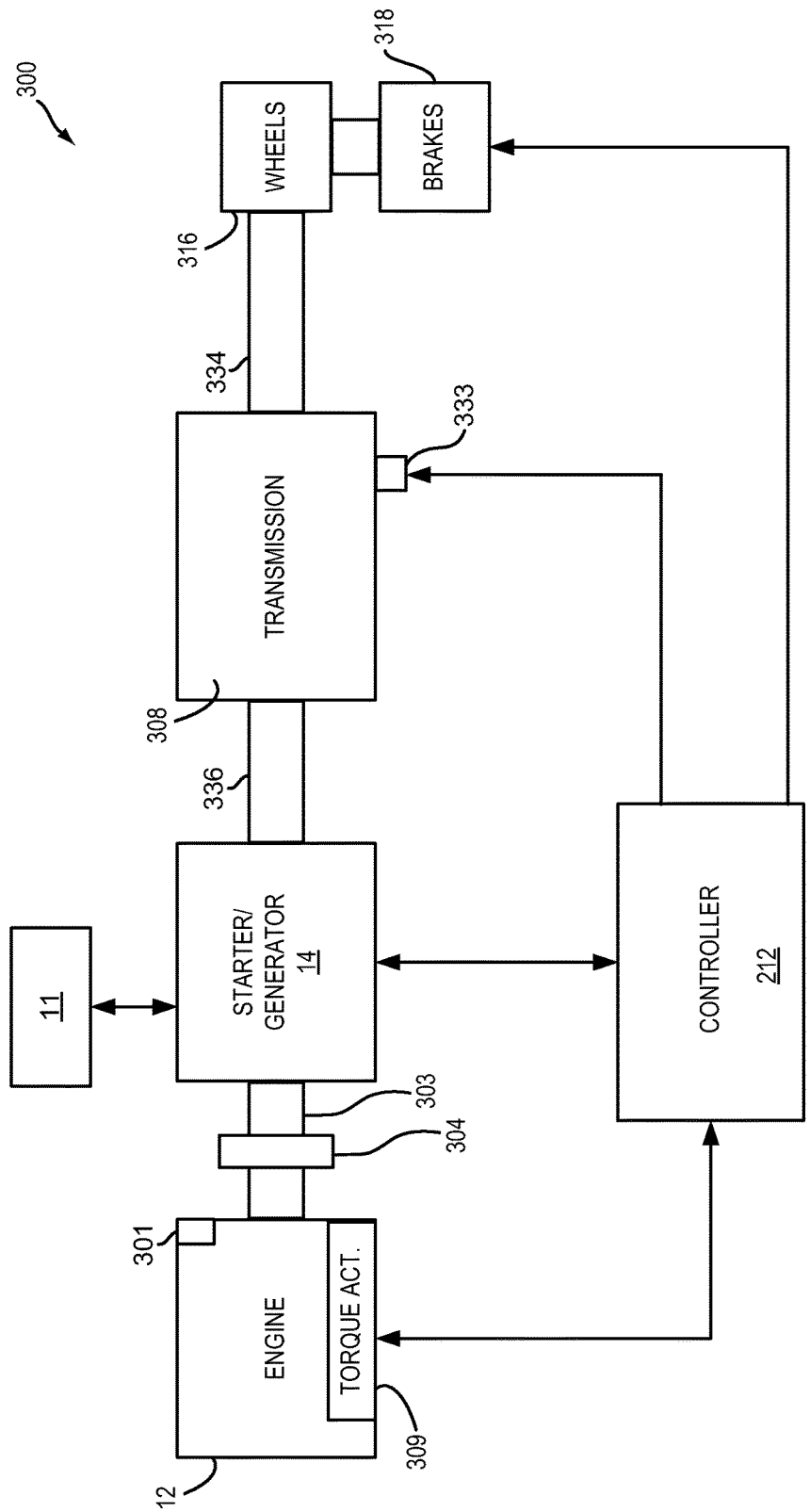
FIG. 3 shows an example vehicle driveline for the vehicle of FIG. 1.

The present description is related to flushing of lubricant from refrigerant subsystem components where it is not desired. Specifically, lubricant may be flushed from such components by activating the compressor while the vehicle is operating and/or while the vehicle is not being operated. Components where lubricant has accumulated may be pressurized to force the lubricant to detach itself from inner walls of components and entrain with refrigerant, so that it may return to the compressor where it is used to lubricate the compressor. The vehicle may be a passenger vehicle as is shown in FIG. 1 or a commercial vehicle (not shown). The vehicle includes a climate control system including a heat pump as is shown in FIG. 2. The climate control system may include an engine that is part of a hybrid powertrain as is shown in FIG. 3. Lubricants may be flushed from the heat pump system components according to the method of FIG. 4. The lubricants may be flushed from the vehicle's heat pump system components as is shown in the operating sequence of FIG. 5.

Referring to FIG. 1, a vehicle 10 including an engine 12, an electrical machine 14, and an electrical energy storage device 11 is shown. In one example, the vehicle may be propelled solely via the engine 12, solely via the electrical machine 14, or by both the engine 12 and the electrical machine 14. The electrical machine 14 may be supplied electrical power via the electrical energy storage device 11. The electrical energy storage device 11 may also be recharged via engine 12 providing power to electrical machine 14 and electrical machine outputting electrical energy to electric energy storage device 11. Alternatively, electrical energy storage device may be recharged via converting the vehicle's kinetic energy into electrical energy via electrical machine 14 during vehicle deceleration or hill descent. Electrical energy storage device 11 may also be recharged from a stationary electrical power grid 17 via a home charging system or a remote charging system (e.g., a charging station) and electrical conductor 18. In one example, electrical energy storage device 11 is a battery. Alternatively, electrical energy storage device 11 may be a capacitor or other electric energy storage device.

Referring now to FIG. 2, a vehicle heating system or climate control system 224 is shown. Devices and fluidic passages or conduits are shown as solid lines. Electrical connections are shown as dashed lines.

The vehicle 10 may include a driveline as shown in FIG. 3 or another suitable driveline to propel the vehicle 10 and/or power vehicle components. Vehicle 10 is shown with internal combustion engine 12, and it may be selectively coupled to an electric machine (not shown). Internal combustion engine 12 may combust petrol, diesel, alcohol, hydrogen, or a combination of fuels.

The vehicle 10 may include a passenger compartment or cabin 220, an engine compartment 222, and a climate control system 224. The passenger compartment 220 may be within vehicle 10 and it may receive one or more occupants. A portion of climate control system 224 may be positioned in passenger compartment 220.

Engine compartment 222 may be positioned proximate to passenger compartment 220. One or more power sources, such as internal combustion engine 12, as well as a portion of climate control system 224 may be within engine compartment 222. Engine compartment 222 may be isolated from the passenger compartment 220 via bulkhead 226. The climate control system 224 may circulate air and/or coolant or modify the temperature of air that is circulated in the passenger compartment 220. Further, the internal combustion engine 12 may be heated via climate control system 224 to reduce fuel consumption and emissions. The climate control system 224 may include a coolant subsystem 230, a heat pump subsystem 232, and ventilation subsystem 234.

The coolant subsystem 230, which may also be referred to as a coolant loop, may circulate a coolant, such as glycol, to cool the internal combustion engine 12. For example, waste heat that is generated by the internal combustion engine 12 when the engine is running or operational may be transferred to the coolant and then circulated to radiator 231 to cool internal combustion engine 12. In at least one example, the coolant subsystem 230 may include a coolant pump 240, a heater core 244, and intermediate heat exchanger 211 that may be fluidly interconnected by conduits or passages such as tubes, hoses, pipes, or the like. The coolant subsystem 230 includes radiator 231 for transferring thermal energy to the ambient air surrounding the vehicle 10. The coolant pump 240 may circulate coolant through the coolant subsystem 230. The coolant pump 240 may be powered by an electrical or non-electrical power source. For example, the coolant pump 240 may be operatively coupled to an internal combustion engine 12 via a belt, or alternatively may be driven by an electrically powered motor. The coolant pump 240 may receive coolant from the internal combustion engine 12 and circulate the coolant in a closed loop. Specifically, when the climate control system 224 is in a heating mode, coolant may be routed from the coolant pump 240 to valve 250 and intermediate heat exchanger 211, and then to the heater core 244 before returning to the internal combustion engine 12 as represented by the arrowed lines. When internal combustion engine 12 is outputting a higher level of thermal energy, coolant may flow from pump 240 to radiator 231 before returning to internal combustion engine 12 via heater core 244.

The heater core 244 may transfer thermal energy from the coolant to air in the passenger compartment 220. The heater core 244 may be positioned in the passenger compartment 220 in the ventilation subsystem 234 and may have any suitable configuration. For example, the heater core 244 may have a plate-fin or tube-fin construction in one or more examples.

The heat pump subsystem 232 may operate in various modes, including, but not limited to a cooling mode and heating mode. Further, heat pump subsystem may include a plurality of refrigerant circuits that may be isolated from other refrigerant circuits. For example, heat pump subsystem 232 includes a first refrigerant circuit that includes valve 270, expansion valve 274, and interior heat exchanger 276. Heat pump subsystem includes a second refrigerant circuit that includes valve 270 and bypass passage 285. In other variants, heat pump subsystem 232 may include additional refrigerant circuits that provide additional functionality. Thus, heat pump subsystem 232 may include a plurality of refrigerant circuits through which refrigerant passes.

In the cooling mode, the heat pump subsystem 232 may circulate a heat transfer fluid, which may be called a refrigerant, to transfer thermal energy from inside the passenger compartment 220 to outside the passenger compartment 220. Refrigerant may pass through interior heat exchangers 276 during cooling mode. In cooling mode, first control valve 271 is in an open state such that first expansion valve 264 is bypassed. Second control valve 270 directs refrigerant to second expansion valve 274, thereby preventing flow through bypass passage 285.

In a heating mode, the heat pump subsystem 232 may transfer thermal energy from exterior heat exchanger 266 to intermediate heat exchanger 211. Intermediate heat exchanger may be a gas to liquid heat exchanger which allows heat to be transferred to coolant, and the coolant may warm the passenger cabin via heater core 244. In heating mode, first control valve 271 is closed such that first expansion valve 264 expands refrigerant that flows to exterior heat exchanger 266. Second control valve 270 directs refrigerant to bypass passage 285, thereby preventing flow through interior heat exchanger 276.

The pump 260, which may also be called a compressor, may pressurize and circulate the refrigerant through the heat pump subsystem 232. The pump 260 may be powered by an electrical or non-electrical power source. For example, the pump 260 may be operatively coupled to internal combustion engine 12 or driven by an electrically powered motor. The pump 260 may provide high pressure refrigerant to first expansion valve 264 and exterior heat exchanger 266 when first control valve 271 is closed. Refrigerant may bypass expansion valve 264 when first control valve 271 is in an open state. In some examples, an oil separator may be placed at the outlet of pump 260. Refrigerant may flow through heat pump subsystem 232 via motive force of compressor 260 in the direction of arrows 297.

The first expansion device 264 may be positioned between and may be in fluidic communication with pump 260 and the exterior heat exchanger 266. The first expansion device 264 may be provided to change the pressure of the refrigerant. For example, the first expansion device 264 may be a thermal expansion valve (TXV) or a fixed or variable position valve that may or may not be externally controlled. The first expansion device 264 may reduce the pressure of the refrigerant that passes through the first expansion device 264 from the pump 260 to the exterior heat exchanger 266. Therefore, high pressure refrigerant received from the pump 266 may exit the first expansion device 264 at a lower pressure and as a liquid and vapor mixture in the heating mode.

The exterior heat exchanger 266 may be positioned outside the passenger compartment 220. In a cooling mode or air conditioning context, the exterior heat exchanger 266 may function as a condenser and may transfer heat to the surrounding environment to condense the refrigerant from a vapor to a liquid. In a heating mode, the exterior heat exchanger 266 may function as an evaporator and may transfer heat from the surrounding environment to the refrigerant, thereby causing the refrigerant to vaporize.

The second control valve 270 may be positioned between external heat exchanger 266 and second expansion valve 274. The passage between second control valve 270 and second expansion valve 274 allows refrigerant to selectively reach internal heat exchanger 276. In one example, second control valve 270 is a three-way valve that selectively allows refrigerant to flow to second expansion valve 274 or bypass passage 285.

The accumulator 272 may act as a reservoir for storing any residual liquid refrigerant so that vapor refrigerant rather than liquid refrigerant may be provided to the pump 260. The accumulator 272 may include a desiccant that absorbs small amounts of water moisture from the refrigerant.

The interior heat exchanger 276 may be fluidly connected to the second expansion device 274. The interior heat exchanger 276 may be positioned inside the passenger compartment 220. In a cooling mode or air conditioning context, the interior heat exchanger 276 may function as an evaporator and may receive heat from air in the passenger compartment 220 to vaporize the refrigerant. Refrigerant exiting the interior heat exchanger 276 may be routed to the accumulator 272. In the heating mode, interior heat exchanger 276 is bypassed.

The ventilation subsystem 234 may circulate air in the passenger compartment 220 of the vehicle 10. The ventilation subsystem 234 may have a housing 290, a blower 292, and a temperature door 294.

The housing 290 may receive components of the ventilation subsystem 234. In FIG. 2, the housing 290 is illustrated such that internal components are visible rather than hidden for clarity. In addition, airflow through the housing 290 and internal components is represented by the arrowed lines 277. The housing 290 may be at least partially positioned in the passenger compartment 220. For example, the housing 290 or a portion thereof may be positioned under an instrument panel of the vehicle 10. The housing 290 may have an air intake portion 200 that may receive air from outside the vehicle 10 and/or air from inside the passenger compartment 220. For example, the air intake portion 200 may receive ambient air from outside the vehicle 10 via an intake passage, duct, or opening that may be located in any suitable location, such as proximate a cowl, wheel well, or other vehicle body panel. The air intake portion 200 may also receive air only from or more than a predetermined amount (e.g., 75%) from inside the passenger compartment 220 and recirculate such air through the ventilation subsystem 234 (e.g. recirculation mode). One or more doors or louvers may be provided to permit or inhibit air recirculation.

The blower 292 may be positioned in the housing 290. The blower 292, which may also be called a blower fan, may be positioned near the air intake portion 200 and may be configured as a centrifugal fan that may circulate air through the ventilation subsystem 234.

The temperature door 294 may be positioned between the interior heat exchanger 276 and the heater core 244. In the example shown, the temperature door 294 is positioned downstream of the interior heat exchanger 276 and upstream of the heater core 244. The temperature door 294 may block or permit airflow through the heater core 244 to help control the temperature of air in the passenger compartment 220. For example, the temperature door 294 may permit airflow through the heater core 244 in the heating mode such that heat may be transferred from the coolant to air passing through the heater core 244. This heated air may then be provided to a plenum for distribution to ducts and vents or outlets located in the passenger compartment 220. The temperature door 294 may be moved between a plurality of positions to provide air having a desired temperature. In FIG. 2, the temperature door 294 is shown in a full heat position in which airflow is directed through the heater core 244.

Figure 4:
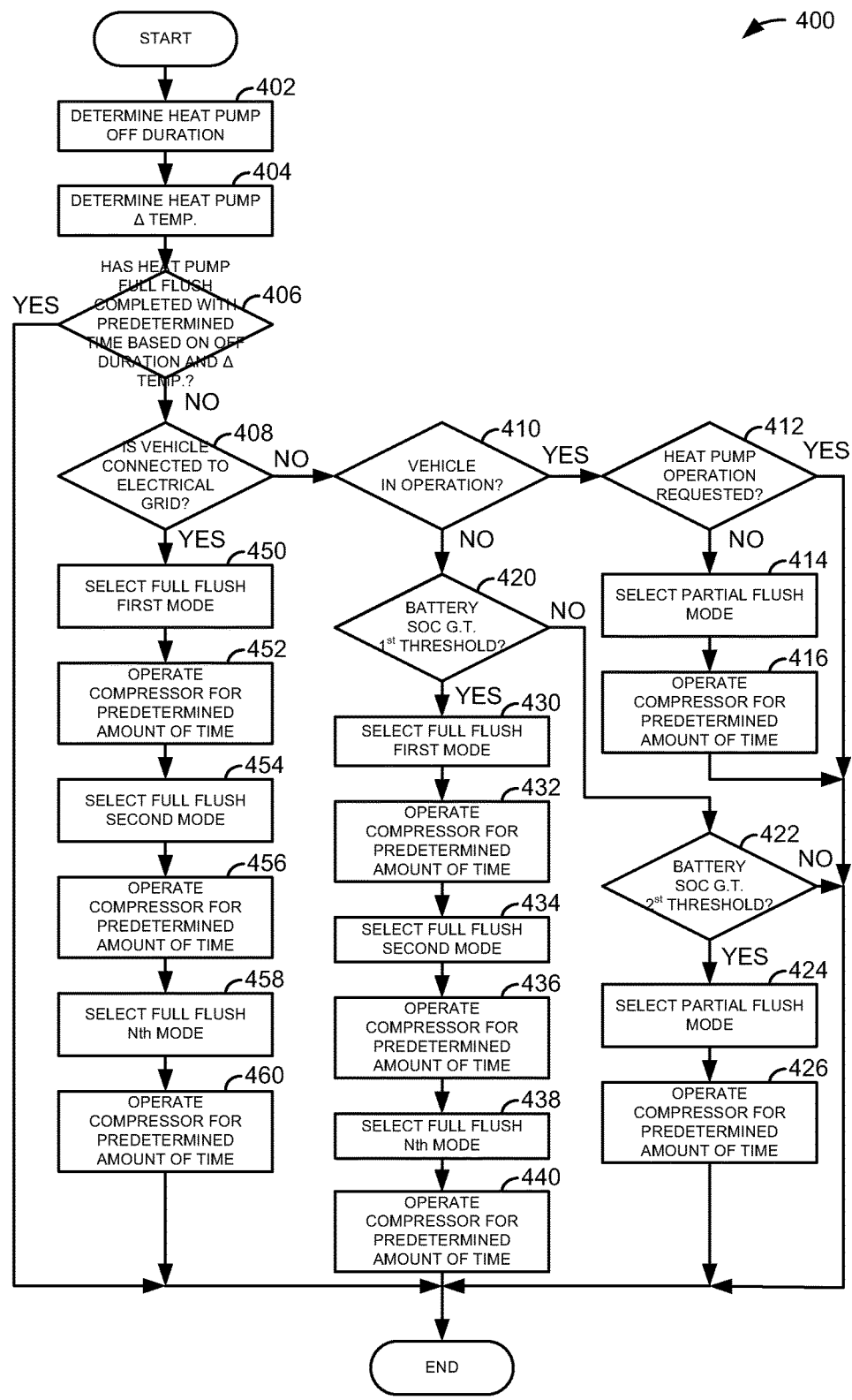
FIG. 4 shows a method for operating a heat pump system.

Controller 212 includes executable instructions of the method in FIG. 4 to operate the valves, fans, and pumps or compressors of the system shown in FIG. 2. Controller 212 includes inputs 201 and outputs 202 to interface with devices in the system of FIG. 2. Controller 212 also includes a central processing unit 205 and non-transitory memory 206 for executing the method of FIG. 4.

Lubricant may enter heat pump subsystem 232 via pump 260 in several ways. For example, pump 260 may be pre-charged with a certain amount of a lubricant such as oil to lubricate pump subsystem 232 and reduce the possibility of pump 260 seizing. Some of this lubricant may be entrained by the refrigerant to the rest of the system as the refrigerant flows through the pump. Lubricant may also be drawn to areas of heat pump subsystem 232 that are lower in temperature when pump 260 is inactive. In one example, lubricant may be drawn to external heat exchanger 266 when passenger compartment 220 is at a higher temperature than external heat exchanger 266 (e.g., on warm days when a vehicle is stopped and windows are rolled up). Consequently, it may be desirable to operate pump 260 to drive lubricant back to pump 260 where it may be used to lubricate pump 260.

Referring now to FIG. 3, a block diagram of a vehicle driveline 300 in vehicle 10 is shown. Driveline 300 may be powered by engine 12. Engine 12 may be started with an engine starting system including starter 301 or via electric machine or driveline integrated starter generator (DISG) 14. Further, engine 12 may generate or adjust torque via torque actuator 309, such as a fuel injector, throttle, camshaft, etc.

An engine output torque may be transmitted to driveline disconnect clutch 304. Driveline disconnect clutch selectively couples and decouples driveline 300. Driveline disconnect clutch 304 may be electrically or hydraulically actuated. The downstream side of driveline disconnect clutch 304 is shown mechanically coupled to DISG input shaft 303.

DISG 14 may be operated to provide torque to driveline 300 or to convert driveline torque into electrical energy to be stored in electric energy storage device 11. DISG 14 has a power output that is greater than starter 301. Further, DISG 14 directly drives driveline 300 or is directly driven by driveline 300. There are no belts, gears, or chains to couple DISG 14 to driveline 300. Rather, DISG 14 rotates at the same rate as driveline 300 and may be mechanically coupled to transmission 308 via shaft 336. Electrical energy storage device 11 may be a battery, capacitor, or inductor. The downstream side of DISG 14 is mechanically coupled to transmission 308.

Automatic transmission 308 includes gear clutches 333 (e.g., gears 1-6) for adjusting a transmission gear ratio. The gear clutches 333 may be selectively engaged to propel vehicle 10. Torque output from the automatic transmission 308 may in turn be relayed to wheels 316 to propel the vehicle via output shaft 334. Output shaft 334 delivers torque from transmission 308 to wheels 316. Automatic transmission 308 may transfer an input driving torque to the wheels 316.

Further, a frictional force may be applied to wheels 316 by engaging wheel friction brakes 318. In one example, wheel friction brakes 318 may be engaged in response to the driver pressing his foot on a brake pedal (not shown). In other examples, controller 212 or a controller linked to controller 212 may apply engage wheel friction brakes. In the same way, a frictional force may be reduced to wheels 316 by disengaging wheel friction brakes 318 in response to the driver releasing his foot from a brake pedal. Further, vehicle brakes may apply a frictional force to wheels 316 via controller 212 as part of an automated engine stopping procedure.

Controller 212 may be programmed to receive inputs from engine 12 and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 212 may control the engine torque output by controlling a combination of fuel pulse width, fuel pulse timing, and air charge. In all cases, engine control may be performed on a cylinder-by-cylinder basis to control the engine torque output. Controller 212 may also control torque output and electrical energy production from DISG by adjusting current flowing to and from DISG windings as is known in the art. Controller 212 may also include non-transitory memory for storing executable instructions of the method described in FIGS. 4 and 5.

When idle-stop conditions are satisfied, controller 212 may initiate engine shutdown by shutting off fuel and spark to the engine. However, the engine may continue to rotate in some examples. Conversely, when restart conditions are satisfied, and/or a vehicle operator wants to launch the vehicle, controller 212 may reactivate the engine by resuming combustion in cylinders. The engine may be started via rotating the engine via DISG 14 or starter 301.

Thus, the system of FIGS. 1-3 provides for a vehicle system, comprising: a heat pump system; and a controller including executable instructions stored in non-transitory memory for flushing lubricant from a plurality of refrigerant circuits in response to a temperature difference between two different locations in the heat pump system. The vehicle system further comprises selecting a flushing mode in response to a vehicle being electrically coupled to a stationary power grid. The vehicle system further comprises additional instructions for selecting a flushing mode in response to whether or not a vehicle in which the heat pump system resides is being operated by a driver. The vehicle system further comprises additional instructions for selecting the flushing mode in response to a battery charge amount. The vehicle system further comprises executable instructions for determining a temperature difference between two different locations of the heat pump system. The vehicle system further comprises additional instructions for opening a plurality of valves that regulate flow of refrigerant to the plurality of refrigerant circuits while flushing lubricant from the plurality of refrigerant circuits.

Referring now to FIG. 4, a method for managing lubricant within a vapor compression heat pump is described. The method of FIG. 4 may be included in the system of FIGS. 1-3 as executable instructions stored in non-transitory memory. Further, the method of FIG. 4 along with the system of FIGS. 1-3 may provide the sequence shown in FIG. 5.

At 402, method 400 determines an amount of time the heat pump has been stopped or deactivated. The heat pump may be considered stopped when a compressor of the heat pump is not operating. In still other examples, a heat pump may be considered stopped when pressure at the compressor outlet is less than a threshold pressure. Method 400 may be executed numerous times when the heat pump is stopped and/or operating. In one example, method 400 may determine an amount of time the heat pump was stopped based on a time that a pump speed sensor is indicates less than a threshold pump speed or an amount of time a pressure sensor indicates less than a threshold pressure. The amount of time since the heat pump was first stopped may be updated each time method 400 is executed. Method 400 proceeds to 404 after the amount of time the heat pump has been stopped is determined.

At 404, method 400 determines temperature differences between heat pump components. In one example, method 400 senses fin temperatures of interior heat exchangers and exterior heat exchangers. The greatest temperature difference between two temperature readings may be determined to be the delta temperature across the heat pump. Further, in some examples a temperature at the outlet of the heat pump compressor may be included in the plurality of heat pump temperature measurements to determine the delta temperature. Method 400 proceeds to 406 after the delta heat pump temperature is determined.

At 406, method 400 judges if the heat pump has performed a full flush within a predetermined range criteria. In one example, the range criteria may be a time being greater than a threshold value. In another example, the range criteria may be an integration of the delta temperature value over the time the compressor is deactivated being greater than a threshold value (e.g., $\int \Delta temp \cdot dt$). In still other examples, other range criteria may be used to determine when it may be desirable for a full flush.

Additionally, method 400 may judge if the heat pump has performed a partial flush within a predetermined range criteria. In one example, the range criteria may be a time being greater than a threshold value. In another example, the range criteria may be an integration of the delta temperature value over the time the compressor is deactivated being greater than a threshold value. In still other examples, other range criteria may be used to determine when it may be desirable for a partial flush. The predetermined range criteria for the partial flush may be different for the predetermined range criteria for the full flush. For example, if a full flush has been completed in 48 hours the answer is yes and method 400 proceeds to exit. On the other hand, if a partial flush has not occurred in 24 hours but has been performed in less than 48 hours, the answer is no and method 400 proceeds to 408.

If method 400 has performed a full flush within a predetermined range criteria and/or if method 400 has performed a partial flush within a different predetermined range criteria, the answer is yes and method 400 proceeds to exit. Otherwise, the answer is no and method 400 proceeds to 408.

A full flush may be described as an operation where each refrigerant circuit or loop in a heat pump (e.g., refrigerant circuit 1 or refrigerant circuit 2 of FIG. 2) that may be isolated from other refrigerant circuits in the heat pump is individually pressurized, without pressurizing the other heat pump refrigerant circuits, by activating the pump and selected control valves. This causes refrigerant to circulate through the active refrigerant circuit and back to the pump, thereby helping to return any lubricant that may have exited the pump to be returned to the pump from the selected refrigerant circuit. The full flush is completed when all refrigerant circuits in the heat pump have been flushed while being isolated from the other refrigerant circuits. By isolating each refrigerant circuit from the other refrigerant circuits during the full flush process, additional pressure and motive force may be directed from the pump and through the activated refrigerant circuit to improve flushing of lubricants from the heat pump refrigerant circuits and back to the pump.

A partial flush may be described as an operation where all refrigerant circuits are opened or activated in a heat pump (e.g., refrigerant circuit 1 or refrigerant circuit 2 of FIG. 2). The refrigerant circuits may be isolatable from other refrigerant circuits in the heat pump. Activating all the refrigerant circuits may allow refrigerant to circulate through all refrigerant circuits and back to the pump, thereby helping to return any lubricant that may have exited the pump, via convective cooling or otherwise, to be returned to the pump. The partial flush is completed when the pump has been active for a threshold amount of time. By simultaneously activating all refrigerant circuits in the heat pump, all heat pump refrigerant circuits may be simultaneously flushed of lubricant. However, since all refrigerant circuits are active, there may be less motive force to drive lubricant back to the pump. Therefore, a partial flush may not be quite as effective as a full flush.

At 408, method 400 judges if the vehicle in which the heat pump operates is electrically coupled to a stationary power grid such as a home charging station. In one example, method 400 may determine that the vehicle is electrically coupled to a stationary power grid based on a voltage sensed at a power connector. If method 400 judges that the vehicle is electrically coupled to a stationary power grid, the answer is yes and method 400 proceeds to 450. Otherwise, the answer is no and method 400 proceeds to 410.

At 410, method 400 judges if the vehicle is in operation. The vehicle may be judged to be in operation if a key is in a key holder or if a device is within proximity of the vehicle. If method judges that the vehicle is in operation, the answer is yes and method 400 proceeds to 412. Otherwise, the answer is no and method 400 proceeds to 420.

At 412, method 400 judges if heat pump operation is requested, in a mode such as heating or cooling. In one example, method 400 judges that heat pump operation is requested when a heat pump input is asserted or when a controller requests heat pump operation. If method 400 judges that heat pump operation is requested, the answer is yes and method 400 proceeds to exit without flushing the system. Instead, the requested heat pump mode is activated and lubricant is returned to the compressor while operating in the requested mode. Otherwise, the answer is yes and method 400 proceeds to 414.

At 414, method 400 selects partial flush mode. Method 400 selects partial flush mode by opening and/or activating all or at least two refrigerant circuits of a plurality of refrigerant circuits. For example, in the system of FIG. 2, method 400 opens valves 268 and 270 to activate the first and second refrigerant circuits. In other examples, where more than two refrigerant circuits are present, method 400 opens two or more refrigerant circuits. Method 400 proceeds to 416 after the partial flush mode is activated.

At 416, method 400 activates and operates the compressor pump to provide motive force to move refrigerant through the activated refrigerant circuits and back to the pump. The lubricant may be collected within the pump or in an oil separator at the outlet of the compressor. Method 400 proceeds to exit after the pump is operated for a predetermined amount of time and then stopped.

At 420, method 400 judges if battery SOC is greater than G.T. a first threshold amount of charge. In one example, method 400 determines battery SOC based on battery voltage. If method 400 judges that battery SOC is greater than the first threshold amount, the answer is yes and method 400 proceeds to 430. Otherwise, the answer is no and method 400 proceeds to 422.

At 422, method 400 judges if battery SOC is greater than a second threshold amount of charge. The second threshold amount of SOC may be less than the second threshold amount of SOC. If method 400 judges that battery SOC is greater than the second threshold amount, the answer is yes and method 400 proceeds to 424. Otherwise, the answer is no and method 400 proceeds to exit.

At 424, method 400 selects partial flush mode. Method 400 selects partial flush mode by opening and/or activating all or at least two refrigerant circuits of a plurality of refrigerant circuits. In other examples, where more than two refrigerant circuits are present, method 400 opens two or more refrigerant circuits. Method 400 proceeds to 426 after the partial flush mode is activated.

At 426, method 400 activates and operates the compressor pump to provide motive force to move refrigerant through the activated refrigerant circuits and back to the pump. The lubricant may be collected within the pump or in an oil separator at the outlet of the compressor. Method 400 proceeds to exit after the pump is operated for a predetermined amount of time and then stopped.

At 430, method 400 selects full flush first mode. Method 400 selects a full flush first mode by opening and/or activating a valve that activates or allows refrigerant to flow through a first refrigerant circuit without refrigerant flowing through the remaining refrigerant circuits. For example, valve 268 of FIG. 2 is opened to activate the first refrigerant circuit. By opening the first refrigerant circuit and not allowing refrigerant flow through remaining refrigerant circuits, it may be possible to increase the amount of lubricant that is flushed from the first refrigerant circuit. Method 400 proceeds to 432 after the full flush first mode is activated.

At 432, method 400 activates and operates the compressor pump to provide motive force to move refrigerant through the first refrigerant circuit and back to the pump. The lubricant may be collected within the pump or in an oil separator at the outlet of the compressor. Method 400 proceeds to 434 after the pump is operated for a predetermined amount of time and then stopped.

At 434, method 400 selects full flush second mode. Method 400 selects a full flush second mode by opening and/or activating a valve that activates or allows refrigerant to flow through a second refrigerant circuit without refrigerant flowing through the remaining refrigerant circuits. For example, valve 270 of FIG. 2 is opened to activate the second refrigerant circuit. By opening the second refrigerant circuit and not allowing refrigerant flow through remaining refrigerant circuits, it may be possible to increase the amount of lubricant that is flushed from the second refrigerant circuit. Method 400 proceeds to 436 after the full flush second mode is activated.

At 436, method 400 activates and operates the compressor pump to provide motive force to move refrigerant through the second refrigerant circuit and back to the pump. The lubricant may be collected within the pump or in an oil separator at the outlet of the compressor. Method 400 proceeds to 438 after the pump is operated for a predetermined amount of time and then stopped.

At 438, method 400 selects full flush $N^{th}$ mode where N refrigerant circuits are present in the heat pump system. All N refrigerant circuits are activated and individually flushed (e.g., isolated from other refrigerant circuits). Method 400 selects a full flush $N^{th}$ mode by opening and/or activating a valve that activates or allows refrigerant to flow through a $N^{th}$ refrigerant circuit without refrigerant flowing through the remaining refrigerant circuits. By opening the $N^{th}$ refrigerant circuit and not allowing refrigerant flow through remaining refrigerant circuits, it may be possible to increase the amount of lubricant that is flushed from the $N^{th}$ refrigerant circuit. Method 400 proceeds to 440 after the full flush $N^{th}$ mode is activated.

At 440, method 400 activates and operates the compressor pump to provide motive force to move refrigerant through the $N^{th}$ refrigerant circuit and back to the pump. The pump is activated every time one of the N refrigerant circuits is activated and individually flushed. The lubricant may be collected within the pump or in an oil separator at the outlet of the compressor. Method 400 proceeds to exit after the pump is operated for a predetermined amount of time and then stopped.

At 450, method 400 selects full flush first mode. Method 400 selects a full flush first mode by opening and/or activating a valve that activates or allows refrigerant to flow through a first refrigerant circuit without refrigerant flowing through the remaining refrigerant circuits. For example, valve 268 of FIG. 2 is opened to activate the first refrigerant circuit. By opening the first refrigerant circuit and not allowing refrigerant flow through remaining refrigerant circuits, it may be possible to increase the amount of lubricant that is flushed from the first refrigerant circuit. Method 400 proceeds to 452 after the full flush first mode is activated.

At 452, method 400 activates and operates the compressor pump to provide motive force to move refrigerant through the first refrigerant circuit and back to the pump. The lubricant may be collected within the pump or in an oil separator at the outlet of the compressor. Method 400 proceeds to 454 after the pump is operated for a predetermined amount of time and then stopped.

At 454, method 400 selects full flush second mode. Method 400 selects a full flush second mode by opening and/or activating a valve that activates or allows refrigerant to flow through a second refrigerant circuit without refrigerant flowing through the remaining refrigerant circuits. For example, valve 270 of FIG. 2 is opened to activate the second refrigerant circuit. By opening the second refrigerant circuit and not allowing refrigerant flow through remaining refrigerant circuits, it may be possible to increase the amount of lubricant that is flushed from the second refrigerant circuit. Method 400 proceeds to 456 after the full flush second mode is activated.

At 456, method 400 activates and operates the compressor pump to provide motive force to move refrigerant through the second refrigerant circuit and back to the pump. The lubricant may be collected within the pump or in an oil separator at the outlet of the compressor. Method 400 proceeds to 458 after the pump is operated for a predetermined amount of time and then stopped.

At 458, method 400 selects full flush $N^{th}$ mode where N refrigerant circuits are present in the heat pump system. Method 400 selects a full flush $N^{th}$ mode by opening and/or activating a valve that activates or allows refrigerant to flow through a $N^{th}$ refrigerant circuit without refrigerant flowing through the remaining refrigerant circuits. All N refrigerant circuits are activated and individually flushed (e.g., isolated from other refrigerant circuits). By opening the $N^{th}$ refrigerant circuit and not allowing refrigerant flow through remaining refrigerant circuits, it may be possible to increase the amount of lubricant that is flushed from the $N^{th}$ refrigerant circuit. Method 400 proceeds to 460 after the full flush $N^{th}$ mode is activated.

At 460, method 400 activates and operates the compressor pump to provide motive force to move refrigerant through the $N^{th}$ refrigerant circuit and back to the pump. The pump is activated every time one of the N refrigerant circuits is activated and individually flushed. The lubricant may be collected within the pump or in an oil separator at the outlet of the compressor. Method 400 proceeds to exit after the pump is operated for a predetermined amount of time and then stopped.

In this way, method 400 provides full and partial flush modes where lubricants may be removed from the heat pump system and concentrated at the pump. Further, method 400 provides flush modes in an operating vehicle as well as when the vehicle is not operating.

Thus, the method of FIG. 4 provides for a method for a vehicle heat pump, comprising: selecting a heat pump flushing mode in response to a vehicle being electrically coupled to a stationary power grid; and flushing the vehicle heat pump via activating a pump. The method includes where the heat pump is flushed of a lubricant. The method includes where the flushing mode is a full flush mode. The method includes where the full flush mode comprises flushing a plurality of refrigerant circuits individually.

In some examples, the method includes where flushing the plurality of refrigerant circuits comprises flushing one refrigerant circuit without flushing other refrigerant circuits. The method includes where the plurality of refrigerant circuits are flushed serially one after the other. The method further comprises not flushing the vehicle heat pump if an integral based on time since the vehicle heat pump is stopped and a temperature difference between two different temperatures of the vehicle heat pump is less than a threshold value.

The method of FIG. 4 also provides for a method for a heat pump, comprising: selecting a heat pump flushing mode when a vehicle in which the heat pump operates is not being operated by a driver in response to a battery charge; and flushing lubricant from a refrigerant circuit when the vehicle is not being operated by the driver. The method includes where the flushing mode is a partial flushing mode. The method includes where the partial flushing mode includes opening valves to allow refrigerant flow through a plurality of refrigerant circuits. The method includes where the flushing mode is a full flushing mode.

In some examples, the method includes not flushing the heat pump if an integral based on time since the vehicle heat pump is stopped and a temperature difference between two different temperatures of the vehicle heat pump is less than a threshold value. The method further comprises operating the heat pump in a partial flushing mode when the vehicle is operated by the driver. The method includes where the heat pump is operated in a partial flushing mode when heat pump operation, such as in a heating or cooling mode. is not requested.

Figure 5:
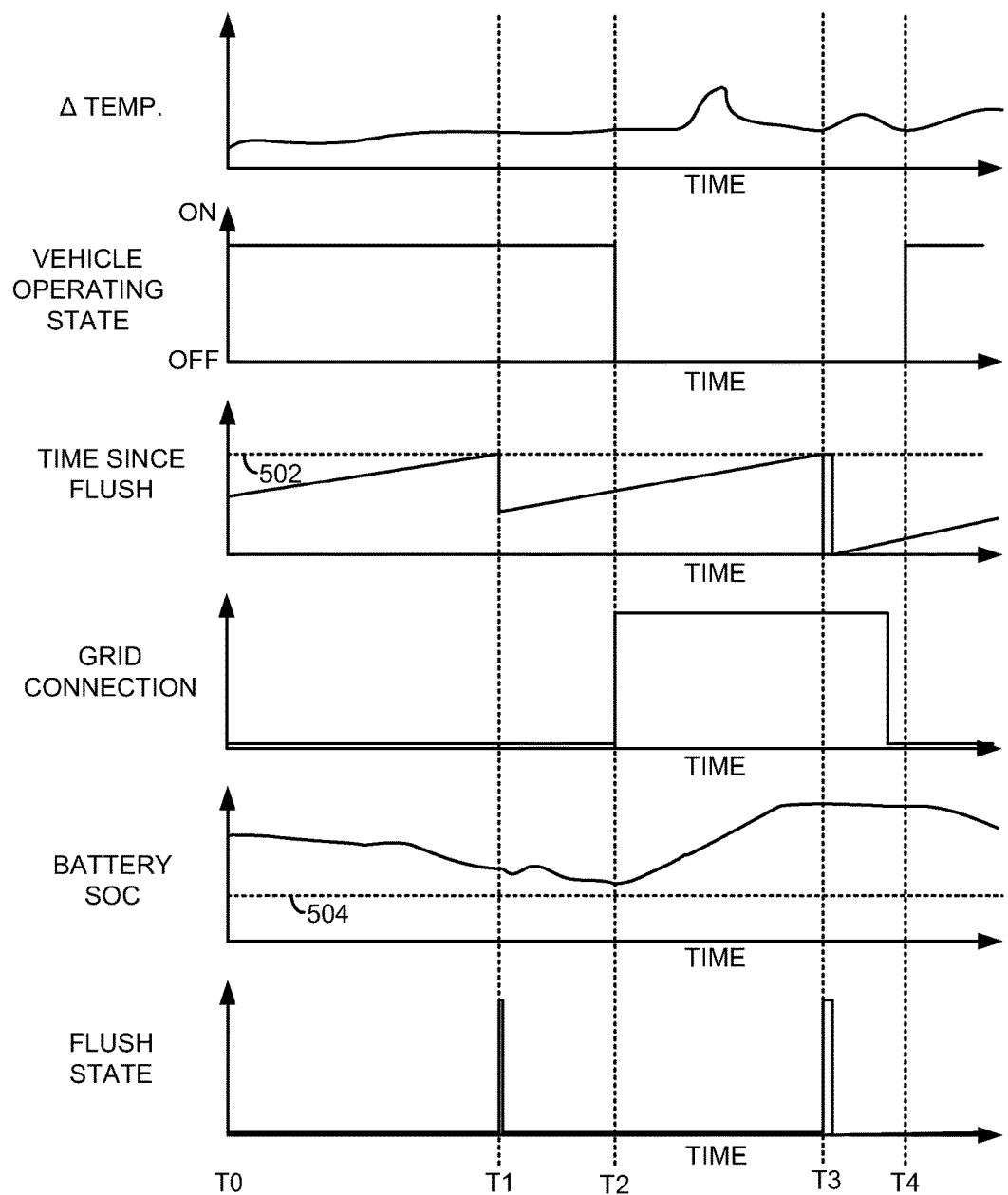
FIG. 5 shows an example simulated sequence for operating a vehicle heat pump system according to the method of FIG. 4.

Referring now to FIG. 5, a simulated sequence for operating a vehicle heat pump according to the method of FIG. 4 is shown. The sequence may be performed by the system shown in FIGS. 1-3.

The first plot from the top of FIG. 5 is a plot of a temperature difference (e.g., A temperature) between two or more locations of a heat pump (e.g., a temperature difference between an exterior heat exchanger and an interior heat exchanger) versus time is shown. The Y axis represents temperature difference between locations of a heat pump. The X axis represents time and time increases from the left side of FIG. 5 to the right side of FIG. 5.

The second plot from the top of FIG. 5 is a plot of vehicle operating state versus time. The vehicle operating state indicates that the vehicle is being operated by a driver when the trace is at a higher level near the Y axis arrow. The vehicle operating state indicates the vehicle is not being operated by a driver when the trace is at a lower level near the X axis. The X axis represents time and time increases from the left side of FIG. 5 to the right side of FIG. 5.

The third plot from the top of FIG. 5 is a plot of accumulated time since flushing the heat pump of lubricant versus time. Accumulated time increases in the direction of the Y axis arrow. The X axis represents time and time increases from the left side of FIG. 5 to the right side of FIG. 5. In this example, heat pump flushing of lubricants may be desired when the accumulated time is greater than threshold level 502.

The fourth plot from the top of FIG. 5 is a plot of a state indicating vehicle connection to a stationary electrical grid versus time. The trace indicating vehicle connection to a stationary electrical grid indicates that the vehicle is electrically connected to a stationary power grid when the trace is at a higher level near the Y axis arrow. The trace indicating vehicle connection to a stationary electrical grid indicates the vehicle is not electrically connected to the power grid when the trace is at a lower level near the X axis. The X axis represents time and time increases from the left side of FIG. 5 to the right side of FIG. 5.

The fifth plot from the top of FIG. 5 is a plot of battery state of charge (SOC) versus time. Battery SOC increases in the direction of the Y axis arrow. The X axis represents time and time increases from the left side of FIG. 5 to the right side of FIG. 5. In this example, the heat pump will not be flushed if the battery SOC is less than threshold 504.

The sixth plot from the top of FIG. 5 is a plot of heat pump flush state versus time. The heat pump flush state indicates that the heat pump is being flushed of lubricant when the trace is at a higher level near the Y axis arrow. The heat pump flush state indicates the heat pump is not being flushed when the trace is at a lower level near the X axis. The X axis represents time and time increases from the left side of FIG. 5 to the right side of FIG. 5.

At time T0, the $\Delta$ temperature in the heat pump system is relatively low. In some examples, the integrated value of $\Delta$ temperature multiplied by the time between temperature samples is compared to a predetermined value. If the integrated value is less than the predetermined value, the heat pump is not flushed. If the integrated value is greater than the predetermined value, the heat pump is flushed. In this example, the $\Delta$ temperature shows times where refrigerant may migrate in a heat pump system due to convective refrigerant motion while the heat pump is off.

The vehicle is operating at time T0 and the time since the last heat pump flush is increasing. The vehicle is not connected to the electrical grid and the battery SOC is slowly decreasing. The flush state also indicates that the heat pump is not being flushed.

At time T1, the $\Delta$ temperature is relatively low and the time since the heat pump was flushed has reached threshold 502. The heat pump enters a flushing mode in response to the time since flushing reaching threshold 502. The heat pump enters a flushing mode when the vehicle is operating. In one example, the flushing mode may be a partial flushing mode so that the heat pump may be partially flushed in a short amount of time as opposed to purging each refrigerant circuit individually one after the other (e.g., serially) where the heat pump compressor is operated a plurality of times before the heat pump system is fully flushed. The vehicle is not electrically coupled to the stationary electrical power grid and the battery SOC is greater than threshold 504 which is a condition to allow flushing. The flush state transitions to a high level in response to entering partial flushing mode and transitions back to a low level after the partial flushing is completed. Since the system is partially flushed, the time since flush is reduced to a value greater than zero so that it will take less time to reach threshold 502 and reinitiate partial flushing. In this way, the amount of time between partial flushes is less than the amount of time between full flushes. In this way, the amount of time between a partial lubricant flush and the next lubricant flush event is less than the amount of time between a full lubricant flush and the next lubricant flush event.

At time T2, the vehicle stops operating. The vehicle may stop operating when a driver removes a key from a key holder or leaves the proximity of the vehicle. The $\Delta$ temperature is at a middle level and the time since flushing continues to increase even though the vehicle is stopped. The driver also electrically couples the vehicle to a stationary power grid as is indicated by the grid connection state transitioning to a higher level. The battery SOC begins to increase in response to the vehicle being electrically coupled to the electrical grid. The vehicle does not enter a flushing mode.

Between time T2 and time T3, the $\Delta$ temperature increases. The $\Delta$ temperature may increase when the vehicle is parked and solar energy heats the vehicle's interior to a temperature greater than ambient temperature. In some examples, the increase in $\Delta$ temperature will shorten the time between entering flushing mode. For example, the $\Delta$ temperature multiplied by the time between $\Delta$ temperature samples (e.g., measurements) may be integrated and compared to a threshold value. Since the $\Delta$ temperature is at an increased level, the integrated value increases at a faster rate, thereby reducing time between entering flushing mode.

At time T3, the time since flush reaches threshold 502 and the flush state transitions to a higher level to indicate the heat pump system is being flushed in response to the time since flush reaching threshold 502. The vehicle enters a full flushing mode in response to being electrically coupled to the grid. The flushing state transitions to a higher level in response to entering flushing mode and the flushing state stays at the higher level for a longer time duration as compared to flushing state at time T1. The flushing state remains higher because a full flush takes more time than a partial flush. The battery SOC continues to increase since the vehicle is electrically coupled to the grid. The time since flush is reset to zero in response to completing the full flushing mode. After flushing is complete, the vehicle is decoupled from the grid and then transitions to an operational state.

At time T4, the vehicle is activated after having been disconnected from the grid. The time since flush continues to increase after the vehicle is activated. In some examples, the time since flush may be reset to zero if the heat pump is operated while the vehicle is activated.

In this way, a heat pump system may be flushed of lubricants whether the vehicle is operating or not operating. Further, the flushing mode may change based on whether the vehicle is operating or not and being further based on battery state of charge.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle system, comprising:
   a heat pump system; and
   a controller including executable instructions stored in non-transitory memory for flushing lubricant from a plurality of refrigerant circuits in response to a temperature difference between two different locations in the heat pump system, and instructions to select a flushing mode in response to a vehicle being electrically coupled to a stationary power grid.

2. The vehicle system of claim 1, further comprising additional instructions for selecting the flushing mode in response to whether or not a vehicle in which the heat pump system resides is being operated by a driver.

3. The vehicle system of claim 2, further comprising additional instructions for selecting the flushing mode in response to a battery charge amount.

4. The vehicle system of claim 1, further comprising executable instructions for determining the temperature difference between two different locations of the heat pump system.

5. The vehicle system of claim 4, further comprising additional instructions for opening a plurality of valves that regulate flow of refrigerant to the plurality of refrigerant circuits while flushing lubricant from the plurality of refrigerant circuits.

6. The vehicle system of claim 1, where the flushing mode is a full flushing mode.

7. The vehicle system of claim 1, where the flushing mode is a partial flushing mode.

8. The vehicle system of claim 6, where the full flushing mode comprises flushing the plurality of refrigerant circuits individually.

9. The vehicle system of claim 8, where flushing the plurality of refrigerant circuits comprises flushing one refrigerant circuit without flushing other refrigerant circuits.

10. The vehicle system of claim 9, where the plurality of refrigerant circuits is flushed serially one after the other.

11. The vehicle system of claim 7, where the partial flushing mode includes opening valves to allow refrigerant flow through the plurality of refrigerant circuits.

12. The vehicle system of claim 4, further comprising additional executable instructions for not flushing lubricant if an integral based on time since the heat pump system is stopped and the temperature difference between the two different locations of the heat pump system is less than a threshold value.

13. The vehicle system of claim 2, further comprising additional instructions for when the vehicle is operated by the driver, operating the heat pump system in a partial flushing mode.

14. The vehicle system of claim 13, where the heat pump system is operated in the partial flushing mode when operation of the heat pump system in a heating or cooling mode is not requested.

* * * * *